United States Patent [19]

Ando et al.

[11] Patent Number: 5,429,848
[45] Date of Patent: Jul. 4, 1995

[54] ELECTRET TUBULAR NONWOVEN FABRIC COMPRISING CIRCUMFERENTIALLY ORIENTED PARALLEL REINFORCING FIBERS WITHIN A TUBULAR NONWOVEN FABRIC

[75] Inventors: Katsutoshi Ando, Otsu; Nobuo Kurata, Shiga; Yoshiharu Okumura; Kouji Sugano, both of Otsu, all of Japan

[73] Assignee: Toray Industries, Inc., Tokyo, Japan

[21] Appl. No.: 174,899

[22] Filed: Dec. 28, 1993

Related U.S. Application Data

[62] Division of Ser. No. 897,099, Jun. 11, 1992, Pat. No. 5,296,061.

[30] Foreign Application Priority Data

| Jun. 12, 1991 | [JP] | Japan | 3-140402 |
| Aug. 27, 1991 | [JP] | Japan | 3-215590 |
| Oct. 24, 1991 | [JP] | Japan | 3-277901 |

[51] Int. Cl.[6] ............... G11C 13/02; B29D 22/00; B32B 27/00
[52] U.S. Cl. ................. 428/36.2; 55/DIG. 39; 307/400; 428/36.1; 428/286; 428/294; 428/298
[58] Field of Search ............ 428/35.6, 36.1, 36.3, 428/36.4, 288, 293, 294, 298, 302, 36.2, 286; 307/400; 55/DIG. 39

[56] References Cited

U.S. PATENT DOCUMENTS

| 4,215,682 | 8/1980 | Kubik et al. | 128/205.29 |
| 4,948,515 | 8/1990 | Okumura et al. | 210/748 |
| 5,035,240 | 7/1991 | Braun et al. | 128/205.27 |

Primary Examiner—James D. Withers
Attorney, Agent, or Firm—Armstrong, Westerman, Hattori, McLeland & Naughton

[57] ABSTRACT

Disclosed are a process for producing a tubular nonwoven fabric and tubular nonwoven fabrics produced by the same. In the process, a web is formed on a first rotating cylinder by catching fibers carried to the surface of the first rotating cylinder by a fluid, the web is transferred to a second rotating cylinder, a tube of the transferred web is formed on and around the second rotating cylinder, and the tube is drawn in the axial direction of the second rotating cylinder to form a tubular nonwoven fabric. The tubular nonwoven fabric with a high unit weight can be produced without elongating or breaking the nonwoven fabric, and the diameter of the tubular nonwoven fabric can be freely changed.

6 Claims, 9 Drawing Sheets

ELECTRET TUBULAR NONWOVEN FABRIC COMPRISING CIRCUMFERENTIALLY ORIENTED PARALLEL REINFORCING FIBERS WITHIN A TUBULAR NONWOVEN FABRIC

This is a division, of application Ser. No. 07/897,099 filed Jun. 11, 1992, now U.S. Pat. No. 5,296,061.

BACKGROUND OF THE INVENTION

1. Field of the Invention

The present invention relates to a process for producing a tubular nonwoven fabric and a tubular nonwoven fabric produced by the process. More particularly, the present invention relates to a process for producing a tubular nonwoven fabric which allows the use of various kinds of fibers, the change in the structure of the nonwoven fabric, the change in the unit weight of the nonwoven fabric, the change in the diameter of the tubular nonwoven fabric and the production stable in quality.

The tubular nonwoven fabric obtained by the process according to present invention can be used in the tubular form or in a formation wherein the tubular nonwoven fabric is folded or in a formation formed by opening the tubular nonwoven fabric by cutting, and can be used widely for filters, civil engineering materials, agricultural materials, packaging materials, wipers, etc.

Further, the present invention relates to new characteristic tubular nonwoven fabrics which are obtained by using the process according to the present invention.

2. Description of the Prior Art

JP-B-SHO 56-48624 discloses a process for producing a tubular nonwoven fabric, wherein a molten polymer extruded from an orifice is formed as fibers by a hot jet flow and a tubular nonwoven fabric is directly formed around a rotating cylinder by catching the formed fibers on the rotating cylinder. In this method, however, since the fibers still remaining soft are transferred to the rotating cylinder by the jet flow having a high speed and the fibers collide against the rotating cylinder when the tubular nonwoven fabric is formed, the tubular nonwoven fabric strongly adheres to the rotating cylinder. Therefore, it is difficult to draw the tubular nonwoven fabric from the rotating cylinder, and it may disadvantageously happen that the nonwoven fabric is elongated or broken when drawn. Moreover, in the production of a tubular nonwoven fabric high in unit weight, if many fibers are deposited on the catching surface of the rotating cylinder, they are blown away by the high velocity hot jet flow. As a result, a uniform tubular nonwoven fabric cannot be obtained. Furthermore, in the production of a tubular nonwoven fabric, the diameter of the tubular nonwoven fabric cannot be changed freely.

A tubular nonwoven fabric obtained by such a process is small in strength because it is composed of unstretched fibers, and so cannot be used for applications requiring high strengths. Further, it is poor in dimensional stability disadvantageously.

Electret tubular nonwoven fabrics excellent in electrical adsorbability, filterability and mechanical strength can be used for various uses such as bag filters, filters for cleaners, filters for copy machines, wipers, hair caps, masks, etc.

JP-B-SHO 59-124 discloses a process for producing an electret nonwoven fabric. However, when the electret nonwoven fabric obtained by this process is formed as a tubular nonwoven fabric, both ends of the nonwoven fabric must be sewn. In such a forming process, the strength of the fabric decreases at the sewn portion, and the adsorbability of the fabric decreases by the existence of the sewing threads. Moreover, for example, when it is used as a filter, the collection efficiency is insufficient.

SUMMARY OF THE INVENTION

The first object of the present invention is to provide a process for producing a tubular nonwoven fabric quite different from the conventional processes, which prevents the elongation or breaking of the tubular nonwoven fabric produced, and allows the production of a tubular nonwoven fabric high in unit weight and allows the diameter of te tubular nonwoven fabric produced to be freely changed.

The second object of the present invention is to provide a tubular nonwoven fabric high in strength and good in dimensional stability by using the above process of the present invention, and a production process thereof.

Further, the third object of the present invention is to provide an electret tubular nonwoven fabric excellent in adsorbability, filterability and strength and free from sewn portions by using the above process of the present invention, and a production process thereof.

To accomplish the first object, a process for producing a tubular nonwoven fabric according to the present invention basically comprises the steps of: forming a web on a first rotating cylinder by catching fibers carried to the surface of the first rotating cylinder by a fluid; transferring the web from the first rotating cylinder to a second rotating cylinder; forming a tube of the transferred web around the second rotating cylinder; and drawing the formed tube in the axial direction of the second rotating cylinder to form a tubular nonwoven fabric.

To accomplish the second object, in the above basic process, a reinforcing thread is inserted into the tube when the tube is formed around the second rotating cylinder. The reinforcing thread is inserted into the tube substantially in the circumferential direction of the tubular form of the nonwoven fabric.

To accomplish the third object, in the above basic process, the web is formed as an electret web by catching the fibers carried by the fluid in a DC field. The tubular nonwoven fabric may be further characterized by having a surface charge density of not less than $1 \times 10^{-10}$ coulombs/cm$^2$.

BRIEF DESCRIPTION OF THE DRAWINGS

These and other objects and advantages of the invention will be apparent from the following description and the accompanying drawings, in which.

DETAILED DESCRIPTION OF THE PREFERRED EMBODIMENTS OF THE INVENTION

Figure 1:
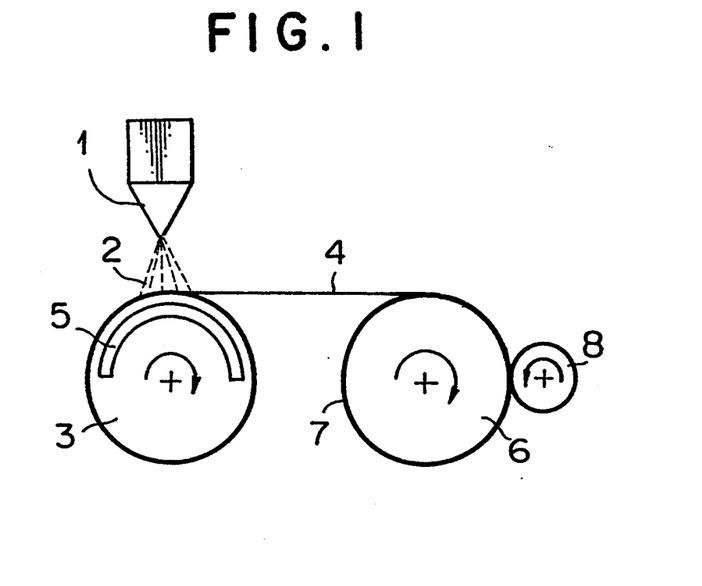
FIG. 1 is a schematic side view of an apparatus for the process according to an embodiment of the present invention, viewed in the axial direction of the rotating cylinders.
Figure 2:
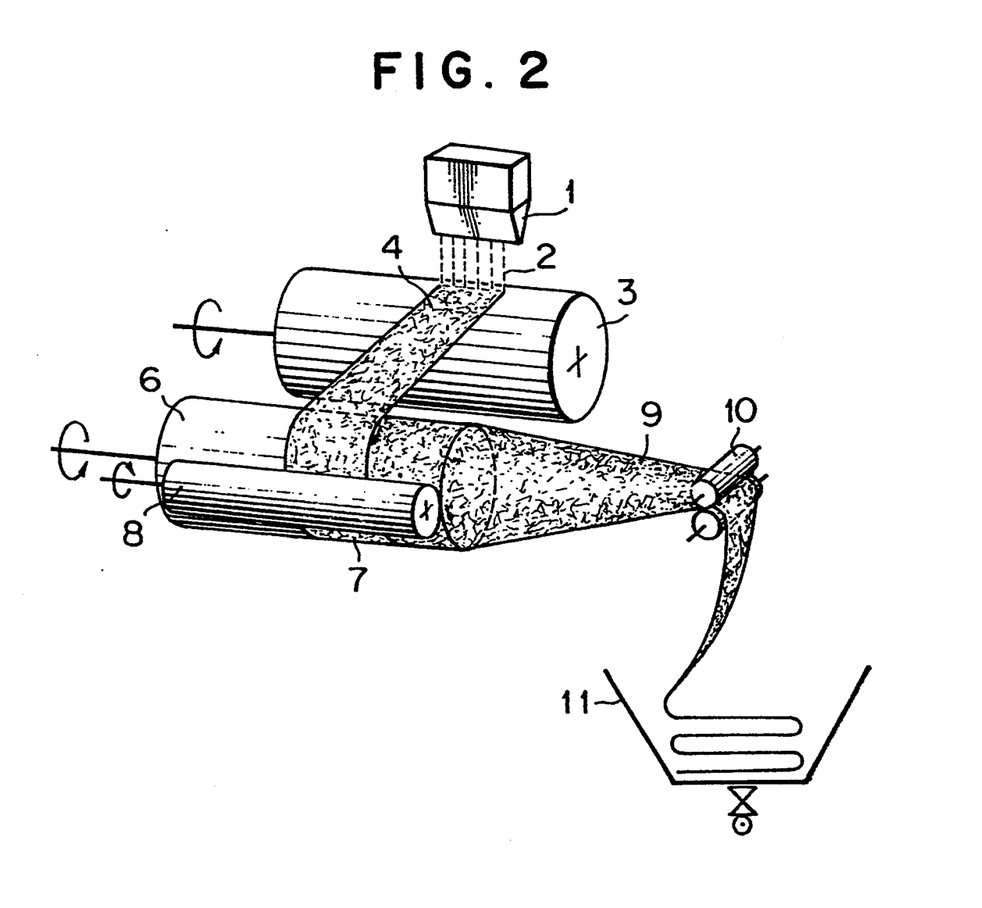
FIG. 2 is a schematic perspective view of the apparatus shown in FIG. 1.

The basic process of the present invention will be described hereinbelow based upon embodiments. FIGS. 1 and 2 show an embodiment of the present invention. FIG. 1 is a side view of an apparatus for forming a tubular nonwoven fabric, viewed in the axial direction of the rotating cylinders. FIG. 2 is a perspective view of the same.

A molten polymer extruded from a melt blow nozzle 1 is formed as melt blow fibers 2 by a hot jet flow, and the fibers are caught by a first rotating cylinder 3 on its surface to form a web 4. The web 4 is transferred to a second rotating cylinder 6 to form a tube 7 on and around the second rotating cylinder. When the web 4 is formed on the first rotating cylinder 3, a suction device 5 can be used for sucking the hot jet flow.

The formed tube 7 is successively drawn in the axial direction of the second rotating cylinder 6, to obtain a tubular nonwoven fabric 9, as shown in FIG. 2. When the tube 7 is formed, if the fibers of the web 4 are still soft, the tube 7 can be formed, but if not, it is preferable to use a third rotating cylinder 8 for mutual pressure bonding or thermal pressure bonding of the fibers constituting the web. Other methods for bonding the fibers constituting the web or the tubular nonwoven fabric can be used, for example, a method for bonding by any non-contact heat source, spray bonding using any chemical adhesive or spray bonding using any hot melt resin.

The tubular nonwoven fabric 9 is taken up by a take-up roller 10 rotating at a speed in synchronization with the second rotating cylinder 6, and received by a box with casters 11.

As the take-up method of the tubular nonwoven fabric 9, it is also possible to wind the tubular nonwoven fabric, while taking it up. Further, when taken up, the tubular nonwoven fabric 9 can be cut open in the longitudinal direction by a cutter such as a knife, for making a continuous flat nonwoven fabric.

Figure 3:
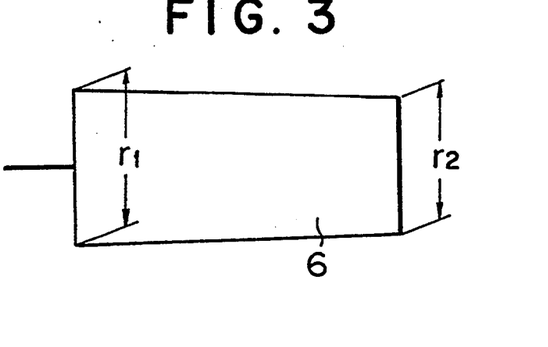
FIG. 3 is a schematic plan view of a second rotating cylinder, showing the taper angle of the second rotating cylinder.

It is preferable that the second rotating cylinder 6 is tapered in the drawing direction, to facilitate the drawing of the tubular nonwoven fabric in the axial direction as shown in FIG. 3. For example, as shown typically in FIG. 3, the diameter of the second rotating cylinder 6 on the undrawing side diameter $r_1$ is larger than the drawing side diameter $r_2$.

The unit weight of the tubular nonwoven fabric can be changed by changing the amount of the carried fibers, the speed of the second rotating cylinder or the drawing speed of the tubular nonwoven fabric.

Figure 4:
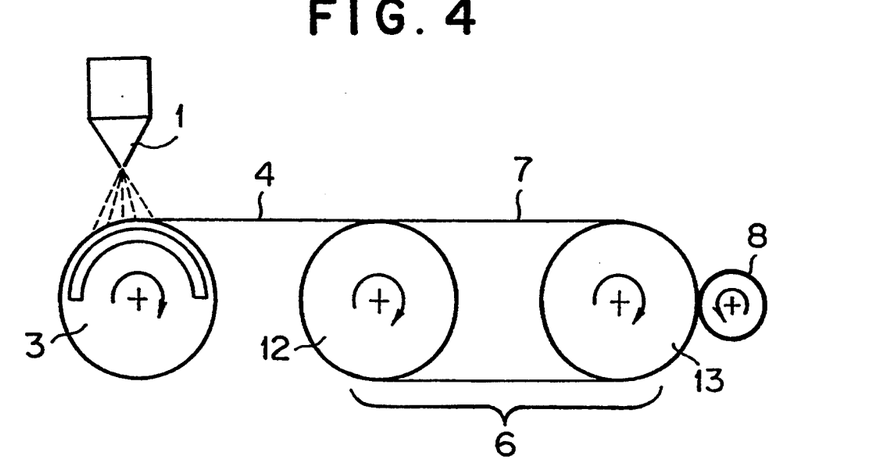
FIG. 4 is a schematic side view of an apparatus for the process according to an embodiment of the present invention which can easily change the diameter of the tubular nonwoven fabric.

FIG. 4 shows an embodiment of the method for changing the diameter of the tubular nonwoven fabric. The web 4 is formed using the melt blow nozzle 1 in the same manner as that described in FIGS. 1 and 2, but in this embodiment, the second rotating cylinder 6 for forming the tube 7 is substituted by at least two rotating cylinders. In this embodiment, the second rotating cylinder 6 comprises a main rotating cylinder 12 and a sub rotating cylinder 13. The distance between these rotating cylinders 12 and 13 can be freely changed, to allow easy change in the diameter of the tubular nonwoven fabric produced. The fibers of the tube are bonded mutually by the third rotating cylinder 8 and the formed tube is successively drawn in the axial direction, to make the tubular nonwoven fabric 9. In this case, to facilitate the drawing of the tubular nonwoven fabric in the axial direction of the main and sub rotating cylinders, the distance between the main and sub rotating cylinders may be gradually smaller in the drawing direction. Instead, it is also allowed to gradually smallen the diameter of both or either of the main and sub rotating cylinders in the drawing direction.

Figure 5:
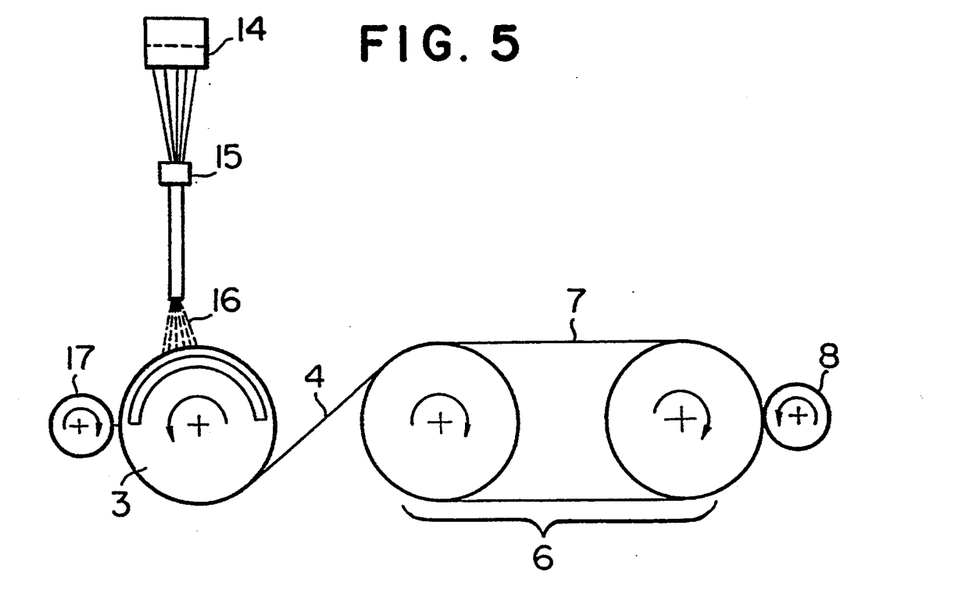
FIG. 5 is a schematic side view of an apparatus for the process according to an embodiment of the present invention which produce a tubular nonwoven fabric by spun bonding.

FIG. 5 shows an embodiment of the process for producing a tubular nonwoven fabric using fibers prepared by spun bonding. A polymer extruded from a nozzle 14 is drawn by an ejector 15, to form spun bonded fibers 16. The spun bonded fibers 16 are caught on the first rotating cylinder 3 to form a web. In this case, for better web formation, it is preferable to use a hot roller 17 for mutual bonding of the fibers. Further, chemical bonding or hot melt bonding can also be used.

Then, the web is transferred to the second rotating cylinder 6, to form the tube 7. In this case, the bonding is intensified by the third rotating cylinder 8, and the tube 7 is successively drawn in the axial direction to produce the tubular nonwoven fabric 9.

The method for forming the fibers to be carried is not particularly restricted, as long as fibers to be carried can be prepared. Methods other than melt blowing and spun bonding, such as flush spinning or opening while carrying staple or long fibers by air current, can be employed.

The material of the fibers carried can be any of synthetic organic polymers, natural fibers and pulp. Furthermore, not only fibers of one kind but also mixed fibers of plural kinds can be used. Particularly, if fibers with a low melting point are mixed, the web or the tube can be easily formed.

It is preferable that the first rotating cylinder 3 is constructed from a porous material to allow the carrier fluid to be passed or sucked. The second rotating cylinder 6 preferably has a surface with a low friction resistance because the tube is drawn in the axial direction. Especially, a satin-finished surface, a surface worked by polyethylene fluoride resin or a mirror-finished surface is preferable. The chemical adhesive for bonding the fibers constituting the tube can be selected from the group of acrylic resins, urethane based resins, epoxy based resins, polyolefin based resins, etc. The hot melt resin can be selected from the group of polyolefin copolymer resins, polyester copolymer resins, etc.

The density of the tubular nonwoven fabric can be freely changed by changing the distance for catching the carried fibers.

In the above basic process of the present invention, to achieve the second object aforementioned, a reinforcing thread is inserted into the tube when the tube is formed on second rotating cylinder. In the basic process of the present invention, it is easy to insert the reinforcing thread into the tube while forming the tube, because by using the second rotating cylinder to form the tube. Therefore, using reinforcing threads is very suitable way for an effective use of the basic process of the present invention.

Figure 6:
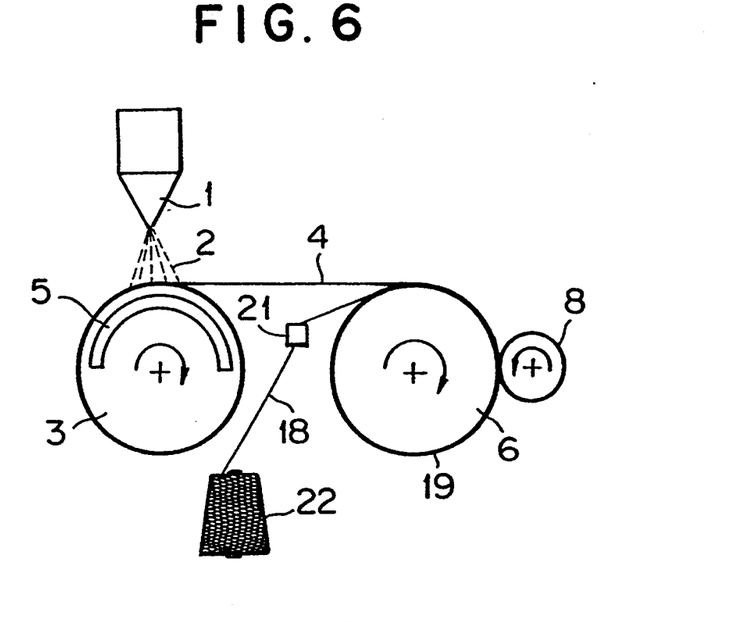
FIG. 6 is a schematic side view of an apparatus for the process according to another embodiment of the present invention.
Figure 7:
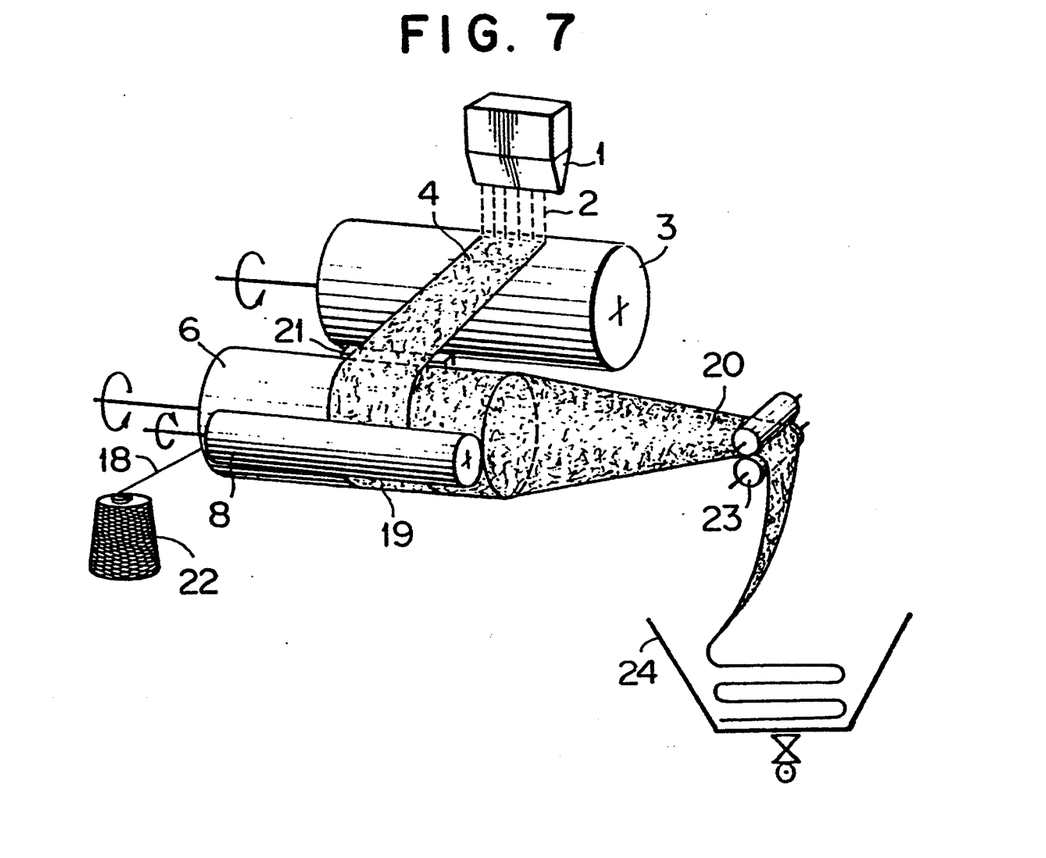
FIG. 7 is a schematic perspective view of the apparatus shown in FIG. 6.

FIG. 6 illustrates an apparatus used for forming the tubular nonwoven fabric with the above reinforcing threads, viewed in the axial direction of the rotating cylinders. FIG. 7 is a perspective view of the same.

A molten polymer extruded from a melt blow nozzle 1 is formed into melt blow fibers 2 by a hot jet flow, and the fibers are caught on a first rotating cylinder 3, to formed a web 4. It is transferred to a second rotating cylinder 6 and formed into a tube 19 around the second rotating cylinder, while reinforcing threads 18 are inserted, to form a reinforced tube 19. When the web 4 is formed on the first rotating cylinder 3, it is also possible to use a suction device 5 for sucking the hot jet flow. The formed tube 19 is successively drawn in the axial direction of the second rotating cylinder 6, as a tubular nonwoven fabric 20.

The reinforcing threads 18 are inserted on the second rotating cylinder 6 at fixed positions or by moving. If they are inserted at fixed positions, they are inserted in parallel, while the tube is drawn in the axial direction, and if they are moved, the intervals between the reinforcing threads can be changed. Furthermore, if they are traversed in the axial direction of the second rotating cylinder 6, they are inserted zigzag or to cross each other.

Figure 8:
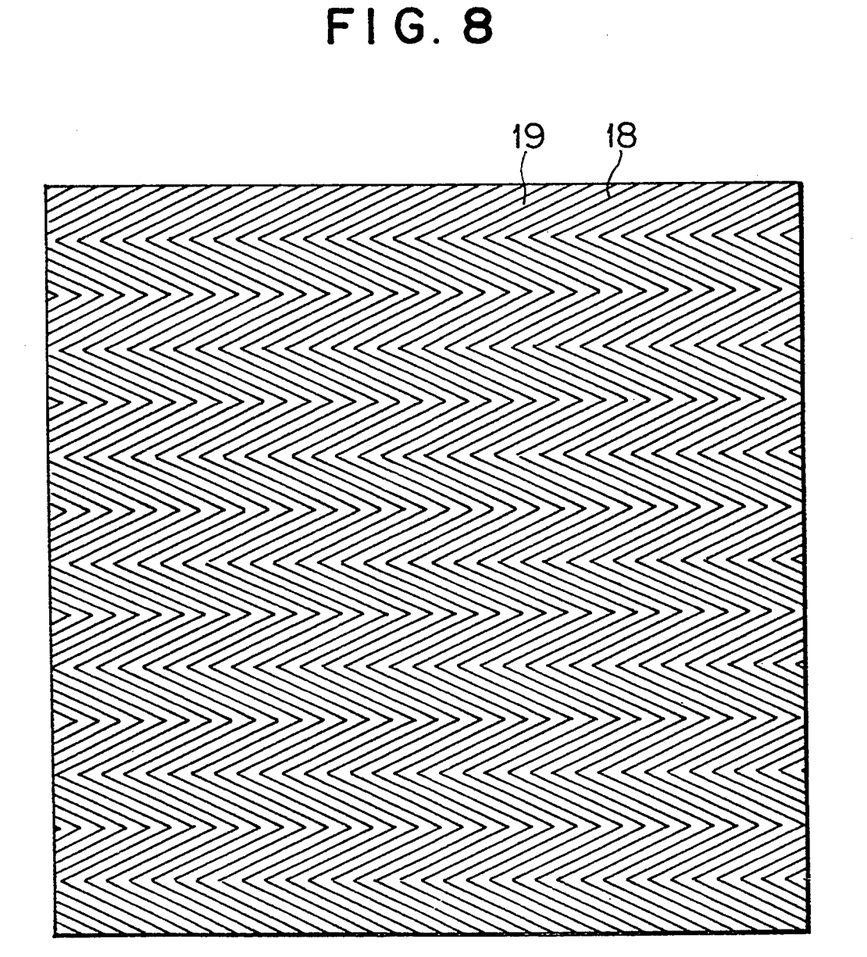
FIG. 8 is a developed view of a tubular nonwoven fabric with reinforcing threads inserted in zigzag pattern and cut open in the longitudinal direction, according to the present invention.
Figure 9:
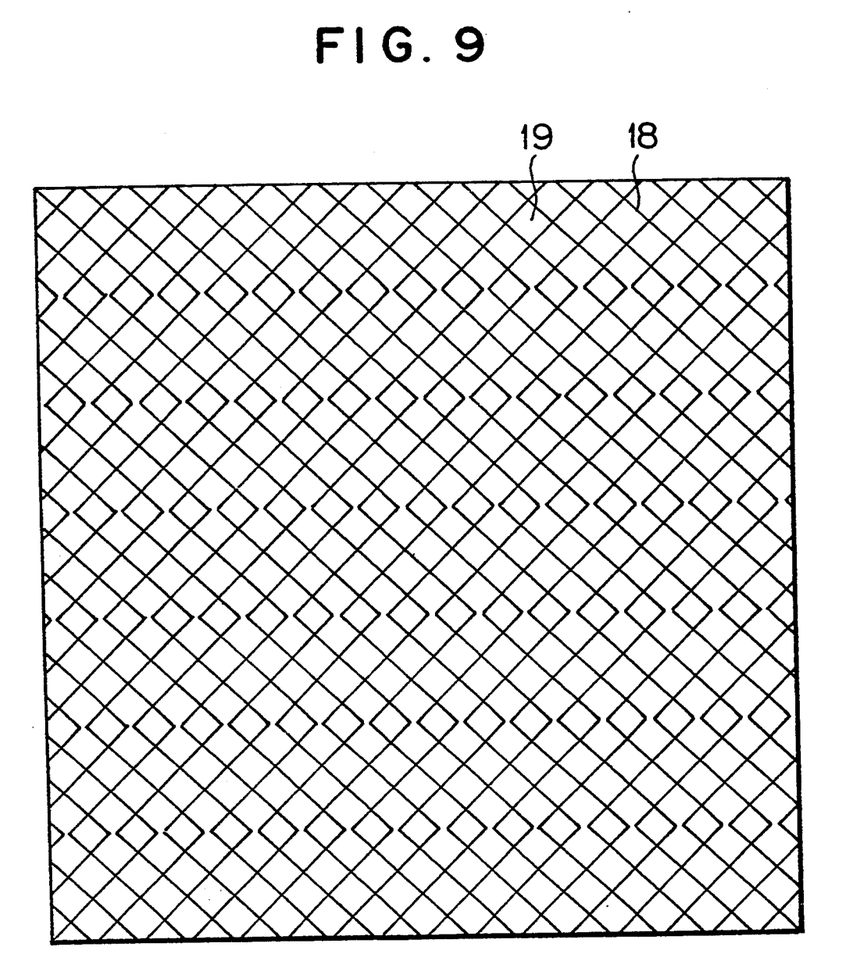
FIG. 9 is a developed view of a tubular nonwoven fabric with reinforcing threads inserted in zigzag crossing pattern and cut open in the longitudinal direction, according to the present invention.

In this process, the reinforcing threads 18 are supplied from bobbins 22 through a metallic guide 21. If the reinforcing threads are traversed integer times during one revolution of the second rotating cylinder 6, when they are inserted, then they are inserted zigzag as shown in FIG. 8. Alternatively, if they are traversed integer times and a half during one revolution of the second rotating cylinder 6, they are inserted to cross each other as shown in FIG. 9. In these cases, the zigzag height depends on the amount of the traverse and the pitch depends on the number of traverse times during one revolution of the second rotating cylinder 6.

The reinforcing threads can be buried in or exposed on the nonwoven fabric. Burying them can be achieved by setting the amount of the traverse smaller than the width of the supplied web. The tubular nonwoven fabric with the reinforcing threads buried like this is good in wear resistance and appearance and the reinforcing threads therein can be fixed. Exposing them can be achieved by setting the amount of the traverse greater than the width of the supplied web. The tubular nonwoven fabric with the reinforcing threads exposed can prevent slipping and allows easy application of an adhesive to the inserted threads.

The reinforcing threads may be bonded to the nonwoven fabric. The bonding can be achieved by using reinforcing threads containing an adhesive, or by applying an adhesive, for example, by external coating. The adhesive can be selected from hot melt adhesives, chemical adhesives, etc.

The material of the inserted threads can be selected from various materials; natural threads such as cotton threads and wool threads, organic synthetic fiber threads such as polyester threads, nylon threads, carbon fiber threads and aromatic polyamide threads, and inorganic fiber threads such as glass fiber threads. In the present invention, the reinforcing strength, elastic modulus, dimensional stability, etc. of the tubular nonwoven fabric obtained can be freely changed by selecting the kinds of the inserted reinforcing threads.

When the reinforced tube 19 is formed, if the fibers of the web 4 are still soft, the reinforced tube 19 can be formed by the fibers bonded, but if not, it is preferable to press or hot-press using a third rotating cylinder 8 shown in FIGS. 6 and 7. Other methods for bonding the fibers of the tube 19 such as a method using a non-contact heat source, spray bonding using any chemical adhesive and spray bonding using any hot melt resin, can be used.

The reinforced tubular nonwoven fabric 20 is taken up by a take-up roller 23 rotating at a speed in synchronization with the second rotating cylinder 6, and received by a box with casters 24.

It is also possible to wind the tubular nonwoven fabric 20, while taking it up. Furthermore, when taken up, the tubular nonwoven fabric can be cut open in the longitudinal direction by a knife, for making a continuous flat nonwoven fabric.

The tubular nonwoven fabric obtained by the above process of the present invention has reinforcing threads inserted substantially in the circumferential direction of the tubular form of the nonwoven fabric.

Figure 10:
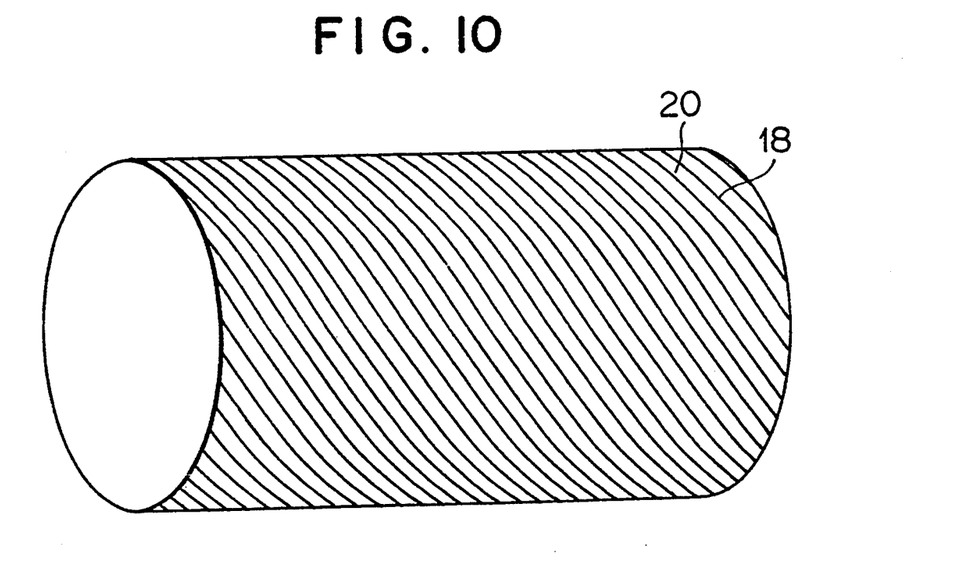
FIG. 10 is a perspective view of the tubular nonwoven fabric obtained by the process shown in FIG. 6, showing an example of the tubular nonwoven fabric.
Figure 11:
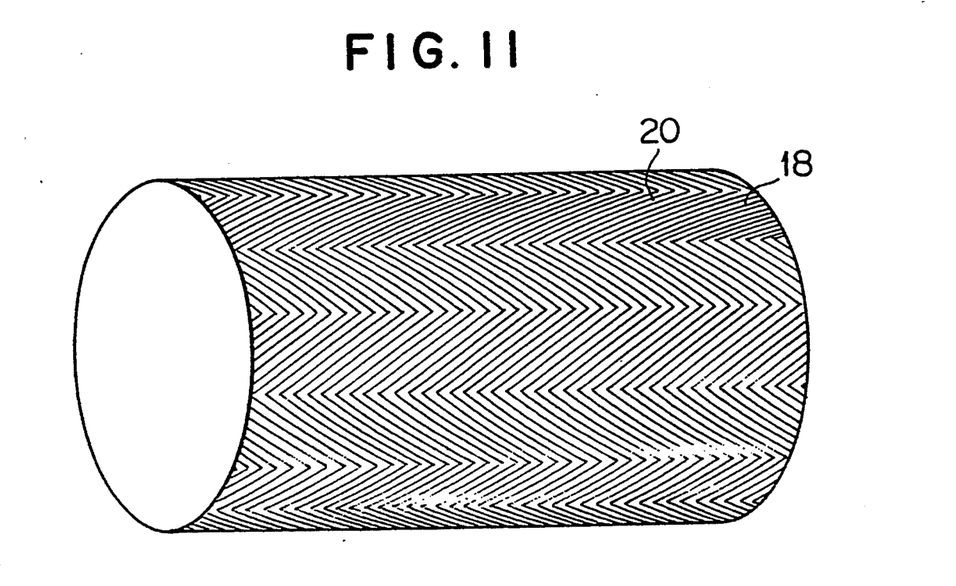
FIG. 11 is a perspective view of the tubular nonwoven fabric obtained by the process shown in FIG. 6, showing another example of the tubular nonwoven fabric.

FIG. 10 shows a tubular nonwoven fabric 20 with reinforcing threads 18 inserted substantially in parallel to each other in a tubular nonwoven fabric matrix, as an embodiment. FIG. 11 shows a tubular nonwoven fabric 20 with reinforcing threads 18 inserted zigzag in a tubular nonwoven fabric matrix, another embodiment.

In the present invention, the nonwoven fabric can be formed by any of melt blown fibers, spun bonded fibers, flush spun fibers, short fibers, etc. The reinforcing threads can be spun yarns, multifilaments, monofilaments, twisted yarns, tapes, slitted yarns, etc. The reinforcing threads can be buried in, exposed on, inserted in or bonded to the nonwoven fabric.

In the present invention, the nonwoven fabric formed by melt blown fibers or spun bonded fibers has an advantage that the strength thereof is high, because the fibers are of continuous fibers. The nonwoven fabric formed by staple fibers has an advantage that various kinds of staple fibers can be mixed to give various functions and high added values and it can be formed in a formation with a large bulk.

The process achieving the third object aforementioned is a process for producing a tubular nonwoven fabric, wherein, when fibers carried by the fluid are caught on the first rotating cylinder to form a web, the web is formed as an electret web by catching the fibers in a DC field. The tubular nonwoven fabric formed by such a process preferably has a surface charge density of $1 \times 10^{-10}$ coulombs/cm$^2$ or more.

In the basic process of the present invention, it is possible to obtain tubular nonwoven fabric without particular sewing at both the ends. Therefore, there are not disadvantages of the sewing being needed, and of decrease of electret property due to the sewn portions. Thus, it is very suitable way for an effective use of the basic process of the present invention to apply the process to production of electret tubular nonwoven fabrics.

Figure 12:
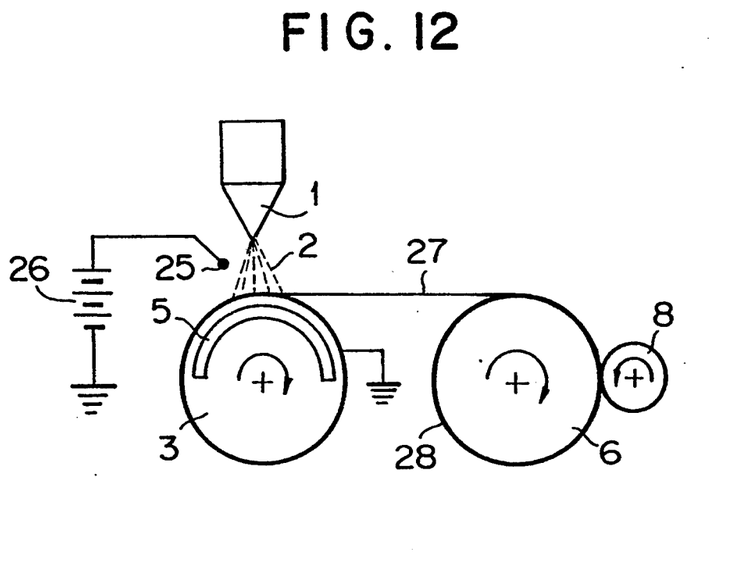
FIG. 12 is a schematic side view of an apparatus for the process according to an embodiment of the present invention which produces an electret tubular nonwoven fabric.
Figure 13:
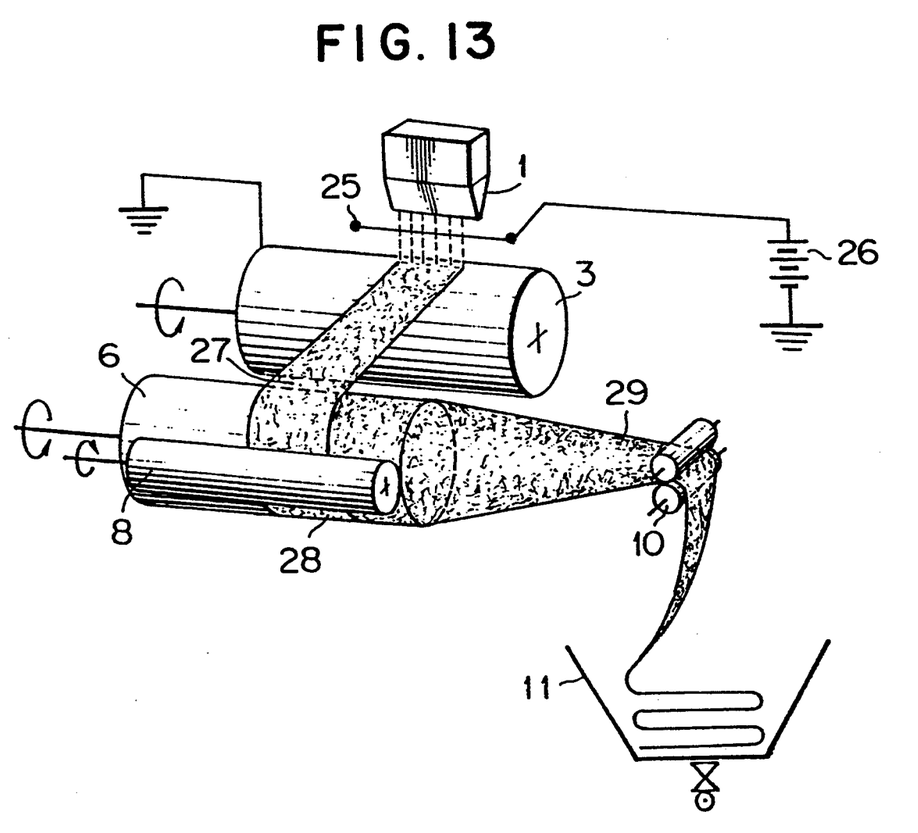
FIG. 13 is a schematic perspective view of the apparatus shown in FIG. 12.

FIG. 12 shows an apparatus for forming an electret tubular nonwoven fabric of the present invention, viewed in the axial direction of rotating cylinders. FIG. 13 is a perspective view of the same.

A molten polymer extruded from a melt blow nozzle 1 is formed into melt blow fibers 2 by a hot jet flow, and the fibers 2 are caught by a first rotating cylinder 3 on its surface in a DC field formed by using a DC high voltage generator 26 between an electrode 25 and the first rotating cylinder 3 grounded, to form an electret web 27. It is transferred to a second rotating cylinder 6, and formed into an electret tube 28 around the second rotating cylinder. When the electret web 27 is formed around the first rotating cylinder 3, a suction device 5 for sucking the hot jet flow can be used.

The formed electret tube 28 is successively drawn in the axial direction of the second rotating cylinder 6, to produce an electret tubular nonwoven fabric 29. When the electret tube 28 is formed, if the fibers of the electret web 27 are still soft, the electret tube 28 can be formed, but if not, it is preferable to apply pressure or thermal pressure for better bonding of the fibers of the tube by a third rotating cylinder 8. Other methods for bonding the fibers constituting the electret tube 28 can be employed, for example, methods for bonding by any non-contact heat source, spray bonding using any chemical adhesive and spray bonding using any hot melt resin.

The electret tubular nonwoven fabric 29 is taken up by a take-up roller 10 rotating at a speed in synchronization with the second rotating cylinder 6, and received by a box with casters 11.

Figure 14:
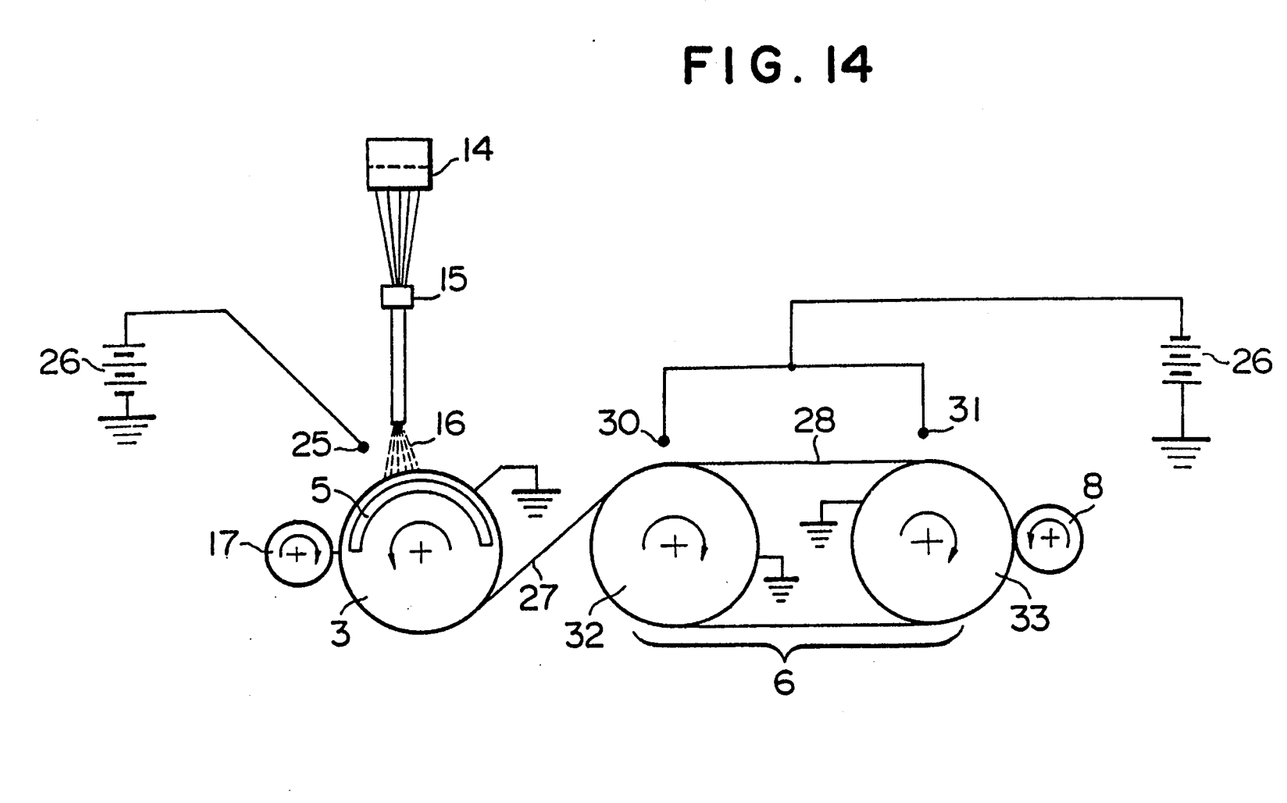
FIG. 14 is a schematic side view of an apparatus for the process according to an embodiment of the present invention which produces an electret tubular nonwoven fabric by spun bodning.

FIG. 14 shows an embodiment of the process for producing an electret tubular nonwoven fabric using fibers prepared by spun bonding. As described in FIG. 5, a polymer extruded from a nozzle plate 14 is drawn by an ejector 15, to form fibers 16 which are caught on first rotating cylinder 3. In this case, the spun bonded fibers 16 are caught in a DC field formed between the electrode 25 and the first rotating cylinder 3 grounded, to form an electret web 27. In this process, for better web formation, it is preferable to use a hot roller 17 for bonding. Furthermore, chemical bonding or hot melt bonding can also be used.

Then, the web is transferred to the second rotating cylinder comprising main and sub rotating cylinders 32 and 33, and an electric field is formed between electrodes 30 and 31 and the main and sub rotating cylinders 32 and 33, respectively grounded, to produce an electret tubular nonwoven fabric. In this case, the bonding of fibers is ensured by third rotating cylinder 8, and the tube 28 is drawn in the axial direction to produce a tubular nonwoven fabric product 29.

Figure 15:
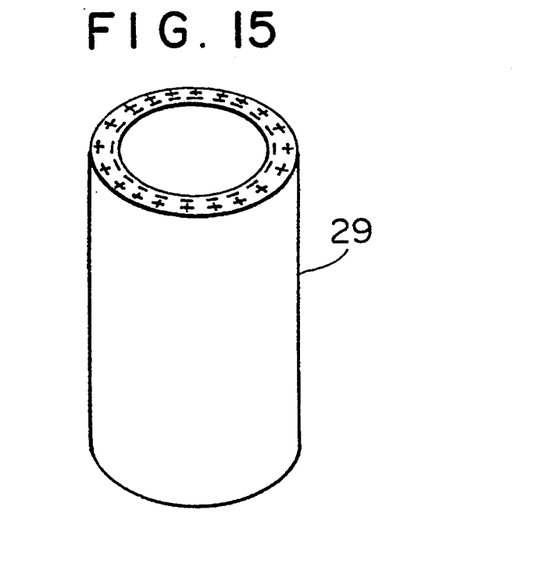
FIG. 15 is a schematic perspective view of an electret tubular nonwoven fabric according to an embodiment of the present invention.

FIG. 15 shows an electret tubular nonwoven fabric produced by such a process.

An electret tubular nonwoven fabric 29 of the present invention has a tubular structure as shown in FIG. 15, and the nonwoven fabric has a surface discharge density of $1 \times 10^{-10}$ coulombs/cm$^2$ or more.

Figure 16:
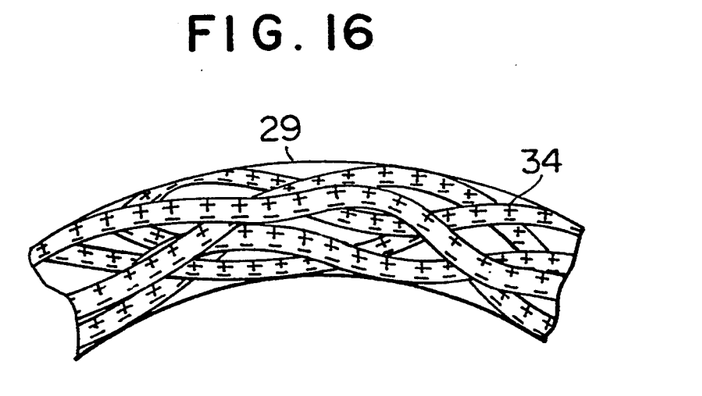
FIG. 16 is an enlarged elevational view of the electret tubular nonwoven fabric shown in FIG. 15, showing the inside electret fibers of the electret tubular nonwoven fabric.

The electret tubular nonwoven fabric is different in electric polarity between outer surface and inner surface, and the electret fibers 34 inside are polarized in thickness direction as shown in FIG. 16.

The surface charge density of the electret tubular nonwoven fabric thus produced indicates $1 \times 10^{-10}$ coulombs/cm$^2$ or more. More preferably, it is $3 \times 10^{-10}$ coulombs/cm$^2$ or more, and the upper limit investigated by the inventors of the present invention is about $1 \times 10^{-8}$ coulombs/cm$^2$ due to discharge limit. Furthermore, the surface side and the back surface side are different in polarity.

Figure 17:
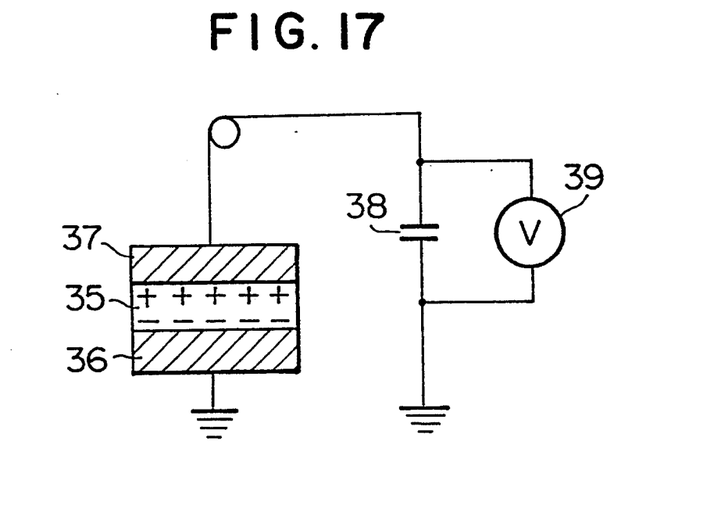
FIG. 17 is a schematic view of a system for measuring the surface charge density of an electret tubular nonwoven fabric of the present invention.

Where, the measurement of the surface charge density is performed as shown in FIG. 17. A sample 35 is placed on an earth electrode 36, and a measuring electrode 37 is brought into contact with the sample. A charge is induced in a capacitor 38, and the potential generated is measured by an electrometer 39. Then, the surface charge density is determined by the following equation:

Surface charge density (coulombs/cm$^2$) = C × V/S

C: Capacity of the capacitor (coulombs)
V: Measured potential (volts)
S: Area of the measuring electrode (3.14 cm$^2$)

In the process for producing a tubular nonwoven fabric according to the present invention, a tubular nonwoven fabric with a large unit weight can be produced without being elongated or broken. Further, if the second rotating cylinder comprises plural rolls, the diameter of the tubular nonwoven fabric can be freely changed. Moreover, the density of the tubular nonwoven fabric can also be freely changed by changing the distance for catching the carried fibers.

The tubular nonwoven fabrics obtained by the process according to the present invention can be broadly used for such applications as filters, bags, clay pipe repair, packaging materials, living materials, wipers, agricultural materials, civil engineering materials and cylindrical thermal insulators.

Furthermore, the flat nonwoven fabrics prepared by cutting open the tubular nonwoven fabrics in longitudinal direction can be used for applications of the conventional nonwoven fabrics. Moreover, since the flat nonwoven fabrics are free from selvage loss, a yield of almost 100% can be achieved.

Especially, a tubular nonwoven fabric produced by the method achieving the second object is high in strength and good in dimensional stability, which are suitably used for the above-described applications.

Furthermore, the electret tubular nonwoven fabric produced by the method achieving the third object is free from any sewn portions, and so can be prevented from the drop of electric adsorbability caused by sewing threads, the increase of pressure loss caused by the overlapped sewn portions when used as a filter, and the leak of dust due to the sewing threads. The freedom from any sewn portions ensures a higher mechanical strength. Furthermore, since the inside charges of the electret tubular nonwoven fabric are the same in polarity, the overlapped inner surfaces repel each other, to keep the tubular form opened for easier handling. When used as a filter, it allows uniform collection in the circumferential direction. Therefore, the electret tubular nonwoven fabrics of the present invention can be broadly used for various applications such as bag filters, vacuum cleaner filters, copier filters, wipers, dust-proof hair caps, masks, etc.

Examples of the present invention will be described below, but the present invention is not limited thereto or thereby.

EXAMPLE 1

Using the process shown in FIG. 2, polypropylene was spun at a spinning temperature of 265° C. by melt blowing, and the melt blow fibers were caught on a first rotating cylinder of 20 cm in diameter. The first rotating cylinder had a 20-mesh wire net surface and was rotated at 20 rpm, to form a web of about 15 cm in width and 3 g/m² by average unit weight. The formed web was transferred to a second rotating cylinder of 32 cm in diameter apart from the surface of the first rotating cylinder by 10 cm, to be formed into a tube. The second rotating cylinder had a satin-finished surface and was tapered in the longitudinal drawing direction at one degree by angle against the horizontal axis. Further, for mutually bonding the fibers of the web on the second rotating cylinder, a third rotating cylinder heated by hot air was used. A similar tubular nonwoven fabric was produced without using the third rotating cylinder, but was inferior in bonding property, to that obtained by using the third rotating cylinder. The tube obtained by using the third rotating cylinder was successively drawn in the axial direction of the second rotating cylinder, to produce a tubular nonwoven fabric of 20 g/m² by unit weight and 100 cm in circumferential length.

EXAMPLE 2

Sea-isle type fibers with nylon 6 as isle ingredient and a hot water soluble polymer obtained by copolymerizing a main component of polyethylene terephthalate with isophthalate and 5-sodiumsulfoisophthalate as sea ingredient were spun (16 isles, isle ingredient 80%, sea ingredient 20%, 24 filaments) and sucked by an ejector at 4500 m/min (5 deniers in average single filament fineness), then being opened through a collision board and caught by a first rotating cylinder of 20 cm in diameter shown in FIG. 4 in a jet flow. The first rotating cylinder had a 20-mesh wire net surface and had a suction device. The caught deposited fibers were temporarily bonded by a 110° C. hot roll, to be formed into a web of about 15 cm in width and 5 g/m² by unit weight. It was transferred to a second rotating cylinder. The second rotating cylinder comprises a main rotating cylinder of 20 cm in diameter and a sub rotating cylinder of 20 cm in diameter with the center distance between them kept at 70 cm. The sub rotating cylinder was kept in contact with a 180° C. third rotating cylinder (hot press roll), to intensify the bonding of the fibers in the tube. The formed tube was successively drawn in the axial direction, to produce a tubular nonwoven fabric of 100 g/m² by unit weight and 200 cm in circumferential length.

The tubular nonwoven fabric obtained was cut open by a knife, to make a flat nonwoven fabric of 200 cm in width. It was needle-punched at a needle density of 50 needles/cm², and fed through 98° C. hot water bath, to remove the sea ingredient. Then, it was water-punched on both sides at a water pressure of 80 kg/cm², by oscillating plate nozzles with many 0.25 mm pores.

The product was very soft, strong, less anisotropic and little frayed at the selvages, and was very suitable for use as wiping cloths and medical sheets.

EXAMPLE 3

Using the process shown in FIG. 3, polypropylene was spun at a spinning temperature of 265° C. by melt blowing, and the melt blow fibers were caught on a first rotating cylinder of 20 cm in diameter. The first rotating cylinder had a 20-mesh wire net surface, and a web with a width of about 15 cm and an average unit weight of 5 g/m² was formed on the surface. The formed web was transferred to a second rotating cylinder with a diameter of 32 cm apart from the surface of the first rotating cylinder by 10 cm, and 150-denier polyester threads were inserted at pitches of 7.5 mm, to form a reinforced tube. The second rotating cylinder had a satin-finished surface, and was tapered at an angle of 1 degree against the horizontal axis in the longitudinal drawing direction. Furthermore, to ensure better bonding between the webs and better bonding of the web to the reinforcing threads on the second rotating cylinder, a third rotating cylinder heated by hot air was used. The tube obtained by using the third rotating cylinder was successively drawn in the axial direction of the second rotating cylinder, to produce a tubular nonwoven fabric of 100 g/m² by unit weight and 100 cm in circumferential length.

The tubular nonwoven fabric thus obtained was good in dimensional stability in use as bag filters, and since it was made of very fine fibers of 0.03 denier in average fineness, it was excellent also in filter performance.

A similar nonwoven fabric was produced without using the third rotating cylinder, but was inferior in bondability, to that obtained by using the third rotating cylinder.

EXAMPLE 4

The fibers prepared by melt blowing of Example 3 were caught on a first rotating cylinder of 20 cm in diameter. The first rotating cylinder had a 20-mesh wire net surface, and on the surface, a web of about 15 cm in width and 20 g/m² by average unit weight was formed. The web was transferred to a second rotating cylinder with a diameter of 32 cm apart from the surface of the first rotating cylinder by 10 cm, and 200-denier aromatic polyamide threads were inserted in parallel to each other while traversing them seven times during one revolution of the second rotating cylinder, to form a reinforced tube with the threads inserted zigzag in parallel to each other at pitches of 3 cm. The inserted pattern of the reinforcing threads was zigzag as shown in FIG. 8, and the zigzag height per revolution was 15 cm and the pitch was 14 cm. The second rotating cylinder had a satin-finished surface and was tapered at an angle of 1 degree against the horizontal axis in the longitudinal drawing direction. Furthermore, to ensure better bonding between the webs and better bonding of the web to the reinforcing threads on the second rotating cylinder, a third rotating cylinder heated by hot air was used. The tube was successively drawn in the axial direction of the second rotating cylinder, to produce a tubular nonwoven fabric of 100 g/m² by unit weight and 100 cm in circumferential length.

The tubular nonwoven fabric thus obtained was cut open and used as an agricultural sheet. It was less broken and showed excellent stability.

EXAMPLE 5

Fibers prepared by melt blowing of Example 3 were caught on a first rotating cylinder of 20 cm in diameter. The first rotating cylinder had a 20-mesh wire net surface, and on it, a web of about 15 cm in width and 20 g/m² by average unit weight was formed. The web was transferred to a second rotating cylinder with a diameter of 32 cm apart from the surface of the first rotating cylinder by 10 cm, and 200-denier aromatic polyamide threads were traversed three times and a half during one revolution of the second rotating cylinder, to form a reinforced tubular nonwoven fabric with the reinforcing threads inserted to cross each other. The inserted pattern of the reinforcing threads were mesh-like crossing as shown in FIG. 9, and the zigzag height per revolution was 15 cm and the pitch was 28 cm. The second rotating cylinder had a satin-finished surface and was tapered at an angle of 1 degree against the horizontal axis in the longitudinal drawing direction. To ensure better bonding between the webs and better bonding of the web to the reinforcing threads on the second rotating cylinder, a third rotating cylinder heated by hot air was used. The tube was drawn successively in the axial direction of the second rotating cylinder, to produce a tubular nonwoven fabric of 100 g/m² by unit weight and 100 cm in circumferential length.

The tubular nonwoven fabric thus obtained was cut open and used as a ground reinforcing sheet. It was excellently less in ground subsidence.

EXAMPLE 6

Polyethylene terephthalate multifilaments were spun together with fibers with a low melting point, and they were opened by an ejector and caught on a first rotating cylinder of 80 cm in diameter, to form a web of 20 cm in width and 5 g/m² by unit weight. It was transferred to a second rotating cylinder of 30 cm in diameter, and 150-denier reinforcing polyester threads were inserted at pitches of 10 mm, to form a reinforced tube as shown in FIG. 10, while its fibers were bonded by a 220° C. hot roller. The tube was drawn in the axial direction, to produce a 100 g/m² tubular nonwoven fabric. The tubular nonwoven fabric thus obtained could be used as cereal bags for a long time.

EXAMPLE 7

Using the process shown in FIG. 12, polypropylene was spun by melt blowing at a spinning temperature of 265° C. and the fibers were caught on a first rotating cylinder of 20 cm in diameter in a DC field. Between a wire electrode and the first rotating cylinder grounded, 30 kV was applied. The first rotating cylinder had a 20-mesh wire net surface and was rotated at 20 rpm, to form an electret web of about 15 cm in width and 5 g/m² by average unit weight. The formed web was transferred to a second rotating cylinder of 32 cm in diameter apart from the surface of the first rotating cylinder by 10 cm, to form an electret tube.

The second rotating cylinder had a satin-finished surface and was tapered at an angle of one degree against the horizontal axis in the longitudinal drawing direction. To ensure the mutual bonding of the fibers of the web on the second rotating cylinder, a third rotating cylinder heated by hot air was used. A similar electret tube was prepared without using the third rotating cylinder, but was inferior in bonded state as compared with the one prepared by using the third rotating cylinder. The tube formed was successively drawn in the axial direction of the second rotating cylinder, to produce a tubular electret nonwoven fabric of 80 g/m² by unit weight and 100 cm in circumferential length.

The surface charge density of the nonwoven fabric thus obtained was $-8 \times 10^{-10}$ coulombs/cm² on the surface side and $+7 \times 10^{-10}$ coulombs/cm² on the back surface side. The filter performance was measured using 0.3 micron polystyrene grains at a measuring wind velocity of 1.5 m/min. As a result, the collection efficiency was found to be 99.9% or more.

The electret tubular nonwoven fabric was strong and free from any sewn portions, so good in collection efficiency. Therefore, it was very suitable for use as bag filters. Furthermore, it was cut and two sheets of it were overlapped for use as wipers. As a result, the wiper made by the overlapped nonwoven fabric sheets was excellent in electric adsorbability.

EXAMPLE 8

Using the process shown in FIG. 14, polypropylene fibers and polypropylene copolymer fibers (125° C. in melting point) were mixed and spun, and opened by sucking at 4500 m/min using an ejector (5 deniers in average single fiber fineness), being caught by a first rotating cylinder of 20 cm in diameter. In this case, an electric field of 7 KV/cm was formed between an electrode and the first rotating cylinder grounded, to form an electret web. The first rotating cylinder had a 20-mesh wire net surface and was provided with a suction device. The caught and deposited electret fibers were temporarily bonded together by a 90° C. hot roll, to be formed into an electret web of about 15 cm in width and 6 g/m² by unit weight. It was transferred to a second rotating cylinder comprising a main rotating cylinder of 20 cm in diameter and a sub rotating cylinder of 20 cm in diameter located with a center distance of 70 cm kept between them, with an electric field of 6 KV/cm formed between a wire electrode and the sub rotating cylinder grounded, to prepare an electret tube. The sub rotating cylider was kept in contact with a 100° C. third rotating cylinder (hot emboss roll), to intensify the bonding of the fibers of the tube. The formed tube was successively drawn in the axial direction, to produce a tubular electret nonwoven fabric of 80 g/m² by unit width and 200 cm in circumferential length.

The surface charge density of the nonwoven fabric thus obtained was $-7 \times 10^{-10}$ coulombs/cm² on the surface side and $+6 \times 10^{-10}$ coulombs/cm² on the back surface side.

This product was used for large bag filters, and since there was no sewn portion, uniform dust collection could be achieved and the bag filter made from the nonwoven fabric showed excellent filter performance.

Although several preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. An electret tubular nonwoven fabric comprising a tube of nonwoven fabric with a plurality of parallel reinforcing threads disposed within said tubular nonwoven fabric and extending substantially in a circumferential direction of said tubular nonwoven fabric, said nonwoven fabric having a surface charge density of not less than $1 \times 10^{-10}$ coulombs/cm$^2$.

2. An electret tubular nonwoven fabric according to claim 1, wherein said tubular nonwoven fabric comprises olefin based fibers and has a polarity of an inner surface and an opposite polarity of an outer surface.

3. An electret tubular nonwoven fabric according to claim 1, wherein the nonwoven fabric is formed from melt blown fibers.

4. An electret tubular nonwoven fabric according to claim 1, wherein the nonwoven fabric is formed from spun bonded fibers.

5. An electret tubular nonwoven fabric according to claim 1, wherein the nonwoven fabric is formed from staple fibers.

6. An electret tubular nonwoven fabric according to claim 1, wherein the nonwoven fabric is composed of fibers having a first melting point and fibers having a second melting point higher than said first melting point.

* * * * *